(12) United States Patent
Fahrländer et al.

(10) Patent No.: US 7,034,523 B2
(45) Date of Patent: Apr. 25, 2006

(54) DEVICE FOR MEASURING PATHS AND/OR POSITIONS

(75) Inventors: Klaus Fahrländer, Denkingen (DE); Dierk Tille, Tuttlingen (DE); Heinrich Müller, Tuttlingen (DE); Florian Kampf, Tuttlingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 10/855,987

(22) Filed: May 27, 2004

(65) Prior Publication Data

US 2005/0007101 A1    Jan. 13, 2005

Related U.S. Application Data

(63) Continuation-in-part of application No. 10/809,258, filed on Mar. 25, 2004, which is a continuation of application No. PCT/DE02/03653, filed on Sep. 26, 2002.

(30) Foreign Application Priority Data

| Sep. 27, 2001 | (DE) | ................. 101 47 849 |
| Apr. 3, 2004 | (DE) | ............. 20 2004 005 282 U |
| Apr. 3, 2004 | (DE) | ............. 20 2004 005 283 U |

(51) Int. Cl.
*G01B 7/14* (2006.01)
*G01B 7/30* (2006.01)

(52) U.S. Cl. .............. 324/207.2; 324/207.24; 324/207.25

(58) Field of Classification Search ................
324/207.2–207.26, 173–174; 338/32 R, 338/32 H
See application file for complete search history.

(56) References Cited

U.S. PATENT DOCUMENTS

| 5,955,881 A | 9/1999 | White et al. |
| 6,178,821 B1 | 1/2001 | Savkar et al. |
| 6,650,109 B1 | 11/2003 | Reichl et al. |
| 2004/0232907 A1 | 11/2004 | Fahrlander et al. |

FOREIGN PATENT DOCUMENTS

| DE | 40 38 674 A1 | 6/1992 |
| DE | 44 00 616 C2 | 7/1995 |
| DE | 199 17 465 A1 | 11/2000 |
| DE | 100 10 042 A1 | 7/2001 |
| DE | 100 23 654 A1 | 11/2001 |
| DE | 102 44 703 A1 | 4/2003 |
| EP | 0 213 732 A1 | 3/1987 |
| EP | 0 907 068 A1 | 4/1999 |
| EP | 1 099 929 A1 | 5/2001 |
| JP | 58-050404 A1 | 3/1983 |
| WO | WO 97/16736 | 5/1997 |

*Primary Examiner*—Bot LeDynh
(74) *Attorney, Agent, or Firm*—Burr & Brown (57) ABSTRACT

The invention relates to a path and/or position measuring device (1) comprising a magnet (2) and a sensor (3) detecting the magnetic field intensity. The magnet (2) and/or the sensor (3) co-operate with a movable element (4), it being possible for a relative movement between the sensor (3) and the magnet (2) to be brought about by means of the movable element (4). Furthermore, the magnet (2) is formed in such a way that the magnetic field intensity varies along an axis (5) of the magnet (2) and is not constant. The relative movement is substantially in the direction of this axis (5) of the magnet (2). The path and/or the position of the movable element (4) can be determined on the basis of the magnetic field intensity detected by the sensor (3).

8 Claims, 8 Drawing Sheets

DEVICE FOR MEASURING PATHS AND/OR POSITIONS

CROSS REFERENCE TO RELATED APPLICATIONS

This application is a continuation-in-part of U.S. application Ser. No. 10/809,258 filed Mar. 25, 2004, which in turn is a continuation of International Application No. PCT/DE02/03653 having an international filing date of Sep. 26, 2002, which designated the United States, the entireties of which are incorporated herein by reference.

This application also claims the benefit of German Application No. 101 47 849.6, filed Sep. 27, 2001, German Application No. 20 2004 005 282.2, filed Apr. 3, 2004, and German Application No. 20 2004 005 283.0, filed Apr. 3, 2004, the entireties of which are incorporated herein by reference.

FIELD OF THE INVENTION

The invention relates to a path and/or position measuring device according to the precharacterizing clause of patent claim 1.

Such path and/or position measuring devices are used in domestic appliances. For example, in a washing machine, the path measuring device can serve for detecting the loading and/or unbalance detection of the laundry drum and the position measuring device can serve for detecting the vibrational behavior and/or tumbling behavior of the laundry drum.

BACKGROUND OF THE INVENTION

DE 40 38 674 A1 discloses a magnetically operating path and/or position measuring device. This has a conventional permanent magnet and a sensor detecting the magnetic field intensity. The magnet and/or the sensor co-operate with a movable element, so that a relative movement between the sensor and the magnet can be brought about by means of the movable element. In the magnetic circuit there is a rail which is made of material with good magnetic conduction and is arranged obliquely with respect to the relative movement, whereby the magnetic field intensity is influenced in a way corresponding to the relative movement, so that the path and/or the position of the movable element can be determined on the basis of the magnetic field intensity detected by the sensor. Instead of such a rail, an increasing air gap may also be provided between the magnet and the sensor, producing a smaller field intensity at the sensor, dependent nonlinearly on the distance between the magnet and the sensor. A disadvantage of devices of such a design appears to be their low sensitivity, inadequate accuracy and also the effort involved in evaluating the magnetic field intensity for the path and/or position determination.

Furthermore, EP 1 099 929 A1 discloses a path and/or position measuring device comprising a magnet which is formed in such a way that the magnetic field intensity varies along an axis of the magnet. A movable element co-operates with the magnet, whereby a relative movement between the sensor and the magnet substantially in the direction of this axis of the magnet can be brought about. On the basis of the magnetic field intensity detected by the sensor, the path and/or the position of the movable element can in turn be determined. A disadvantage of this path and/or position measuring device appears to be its large and complex mechanical form.

SUMMARY OF THE INVENTION

The invention is based on the object of making the path and/or position measuring device simpler and in particular increasing its accuracy.

This object is achieved in the case of a path and/or position measuring device of the generic type by the characterizing features of claim 1.

In the case of the path and/or position measuring device according to the invention, unlike a conventional bar-shaped permanent magnet, the magnet is formed in such a way that the magnetic field intensity varies along an axis of the magnet. The magnet is fastened to the movable element and consequently arranged in the device in such a way that the relative movement is substantially in the direction of this axis of the magnet. Consequently, the sensitivity and accuracy of the path and/or position measuring device can be adapted to the respective requirements in a simple way by the form of the magnet. Further refinements of the invention are the subject of the subclaims.

The sensor in the path and/or position measuring device expediently generates an electrical output voltage in dependence on the magnetic field intensity. The electrical output voltage can be further evaluated in a way which is customary per se by means of an electronic circuit, a microcomputer or the like. For the sake of simplicity, the output voltage may be substantially proportional to the sensed magnetic field intensity, to be precise in particular to the flux density associated with the respective magnetic field intensity.

The known physical measuring methods are suitable for detecting the magnetic field intensity. In particular, the sensor may be an analog type of Hall sensor, GMR sensor or the like.

In a particularly advantageous refinement, the magnet has a ramp- or wedge-shaped form in the direction of the axis, which is accompanied by a linear change in the height of the magnet in the direction of the axis. As a result, the flux density variation for the magnetic field in the direction of the axis is substantially linear. In addition, the air gap between the magnet and the sensor in the path and/or position measuring device can be substantially constant along the direction of the axis. Such a path and/or position measuring device has a constant resolution in the entire measuring range and also constant sensitivity.

The magnet can be produced in its desired form in a low-cost way by injection molding. For this purpose, the magnet consists of polymer-bonded magnetic particles. The magnet may be fastened to the movable element with a latching engagement, fitted into the movable element, integrated into the movable element or the like. If the polymer-bonded magnet is produced by injection molding, it is also appropriate for the sake of simplicity to mold the magnet into the movable element in the manner of a two-component part.

A path and/or position measuring device which, on account of its low cost, is suitable in particular for use in domestic appliances, such as washing machines, laundry dryers or the like, has a push rod as its movable element, it being possible for the push rod to be mounted in a linearly movable manner in a housing. The magnet may be fastened to the push rod in such a way that the axis of the magnet is aligned approximately parallel to the longitudinal axis of the push rod.

In order to provide the path and/or position measuring device with its own intelligence, the sensor, which is designed in particular in the manner of an integrated circuit, is arranged on a printed circuit board, it being possible that electronics for the evaluation of the sensor signal are additionally provided on the printed circuit board. A securing means for fastening the printed circuit board is expediently arranged in the housing. Finally, a plug-in receptacle for a connector for the electrical connection to the printed circuit board may be arranged on the housing, to be precise in particular on the securing means.

In particular in a washing machine or a laundry dryer, the path and/or position measuring device is articulated on the one hand on the movable element, that is the drum, and on the other hand on a fixed element, that is the frame. For the articulation of the push rod on the movable element and of the housing of the path and/or position measuring device on the frame, a ball joint and a fastening plate are preferred, for the sake of simplicity.

In the case of a further path and/or position measuring device according to the invention, the magnet has in turn such a form that the magnetic field intensity varies along an axis of the magnet. The magnet has at least two regions, in which the magnetic field intensity varies differently, so that a different resolution is achieved for the path and/or position determination in the two regions. The sensitivity and accuracy of the path and/or position measuring device can in this way be adapted to the requirements of the respective region in a simple manner. For example, a coarse or fine measurement can be realized in a simple way.

In the case of a form which is simple to produce in production engineering terms, the magnet has in the direction of the axis a multiply ramp- or wedge-shaped form. For example, this form may comprise a number of adjoined sloping sides and an opposite straight side and also have a linear change in the height of the magnet in the direction of the axis. The sloping sides expediently have at least two different gradients. In order that the air gap between the magnet and the sensor is substantially the same along the direction of the axis, it is appropriate to arrange the sensor on the straight side of the magnet.

As already mentioned, the magnet may be fastened to the movable element, which comprises for example a push rod articulated on the movable part, and if appropriate be formed as a polymer-bonded, injection-molded magnet. Similarly, the sensor may be an analog type of Hall sensor, GMR sensor or the like, designed in the manner of an integrated circuit. Furthermore, the sensor and the electronics for the evaluation of the sensor signal may be located on a printed circuit board.

Yet a further path and/or position measuring device according to the invention has two magnets of such a form that the magnetic field intensity varies along an axis of the magnet. The two magnets are arranged opposite each other in such a way that the axes of the two magnets run substantially parallel to each other, and the sensor is located between the two magnets. Such a path and/or position measuring device has a particularly strong magnetic field and is consequently largely insensitive to electromagnetic interference, as can occur for example during use in domestic appliances or in the automotive sector on account of powerful motors, sparking relays or the like.

In the case of a form which is simple to produce in production engineering terms, the magnets have a ramp- or wedge-shaped form in the direction of the axis. For example, this form has a sloping side and a straight side and has a linear change in the height of the magnet in the direction of the axis. In order to ensure a largely parallel magnetic field, the magnets are arranged with the sloping sides facing away from one another and with the straight sides facing one another, the two straight sides expediently being at a substantially constant distance from one another. It is then appropriate for the sensor to be located substantially centrally between the two straight sides.

Here, too, the magnets may be formed as polymer-bonded, injection-molded magnets. Similarly, the sensor may be an analog type of Hall sensor, GMR sensor or the like, designed in the manner of an integrated circuit. Furthermore, the sensor and the electronics for the evaluation of the sensor signal may be located on a printed circuit board.

It is similarly appropriate to fasten the two magnets to the movable element. In a compact form which is suitable for confined installation spaces, the movable element is formed in the manner of a housing for receiving the two magnets, which may take place for example by means of latching engagement. The housing may be articulated on a movable part by means of a ball joint and a fastening plate. The printed circuit board receiving the sensor may be fastened on a slide protruding into the housing. The slide is expediently arranged on a fixed part by means of a ball joint and a fastening plate.

The advantages achieved by the invention are, in particular, that the path and/or position measuring device can be produced in a low-cost and simple manner and can therefore be used in cost-sensitive mass produced articles, such as domestic appliances or the like. Nevertheless, the path and/or position measuring device operates very accurately and also sensitively, so that it can also be used in safety-critical applications, for example in motor vehicles. It is particularly advantageous that the output signal generated by the sensor can be evaluated in a simple and quick manner with regard to the path and/or position determination. Furthermore, the resolution and the output signal achieved can be influenced in a simple way by the form of the magnet, in particular by its gradient in the direction of its axis corresponding to the ramp-shaped form.

BRIEF DESCRIPTION OF THE DRAWINGS

An exemplary embodiment of the invention is described in more detail below and represented in the drawings, in which.

DETAILED DESCRIPTION OF THE DRAWINGS

Figure 1:
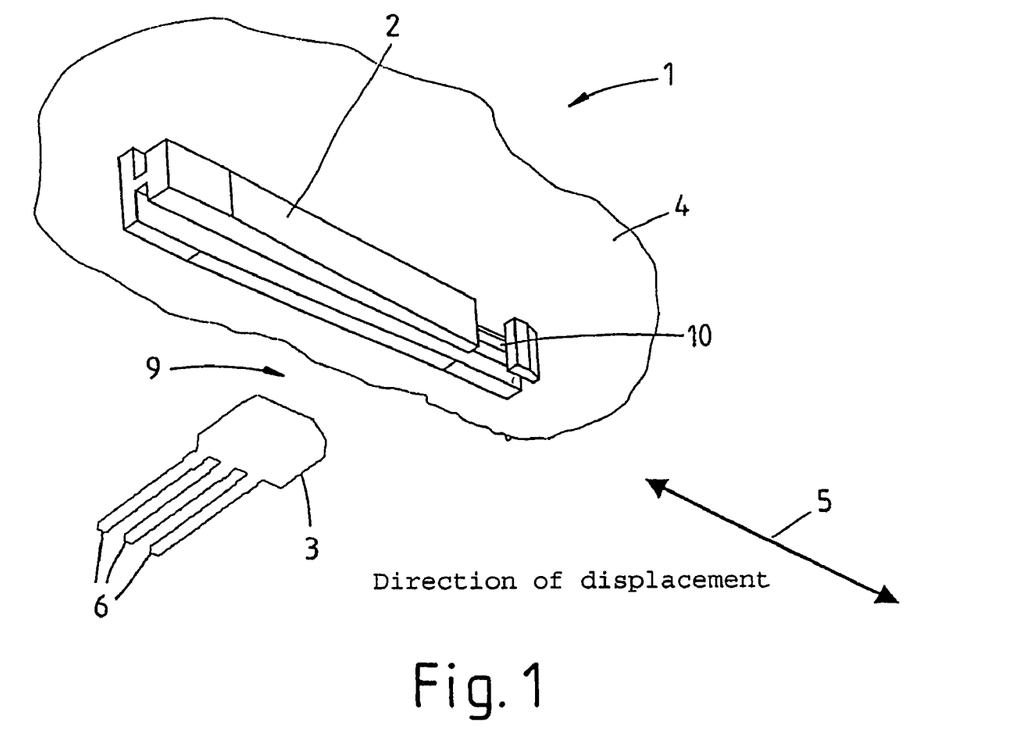
FIG. 1 schematically shows a path and/or position measuring device in a perspective representation in the manner of a basic diagram.

FIG. 1, serving as a basic diagram, shows a path and/or position measuring device 1, which comprises a magnet 2 and a sensor 3 detecting the magnetic field intensity. The magnet 2 and/or the sensor 3 co-operates with a movable element 4, so that a relative movement between the sensor 3 and the magnet 2 can consequently be brought about by means of the movable element 4. In the present case, the magnet 2 is arranged on the movable element 4, which is merely indicated schematically. The magnet 2 is then formed in such a way that the magnetic field intensity along an axis 5 of the magnet 2 varies and is consequently not constant. The magnet 2 is arranged in such a way that the relative movement is substantially in this direction of the axis 5 of the magnet 2. As a result, the path and/or the position of the movable element 4 can be determined on the basis of the magnetic field intensity respectively detected by the sensor 3.

Various further refinements of the path and/or position measuring device 1 are explained in more detail below.

Figure 2:
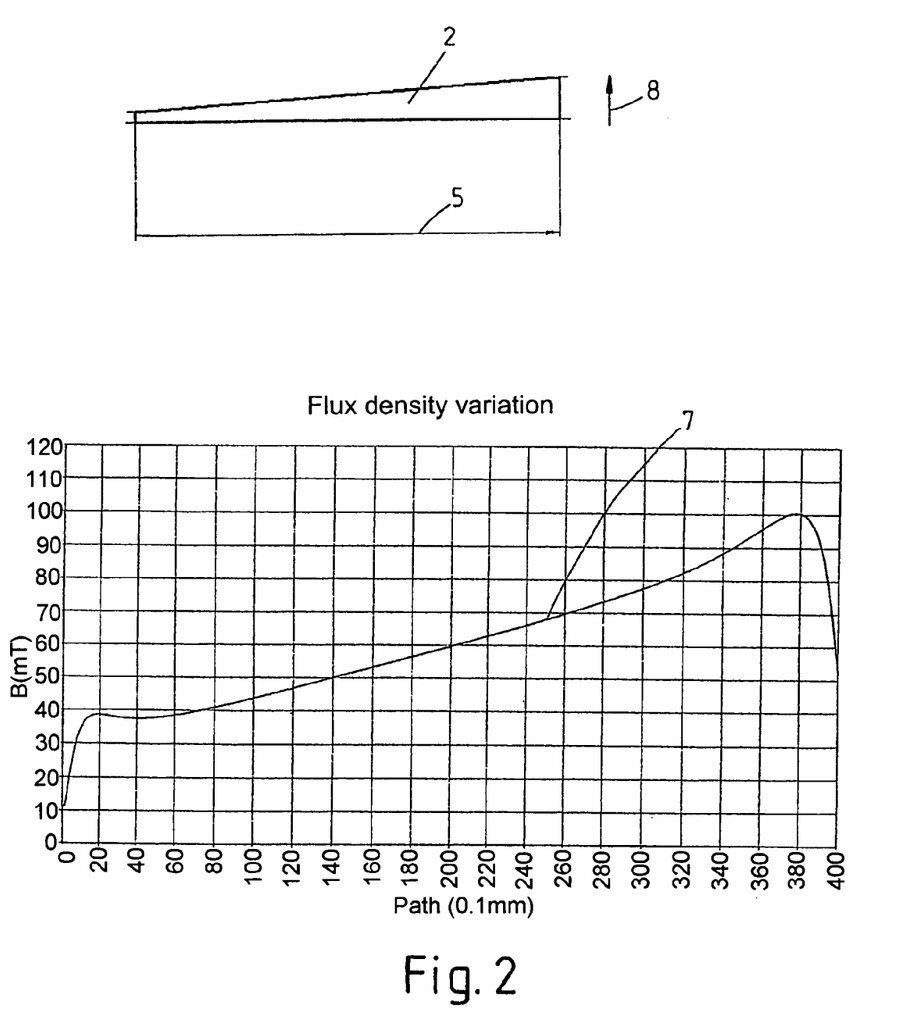
FIG. 2 shows the flux density variation in dependence on the path as a characteristic curve for the path and/or position measuring device according to FIG. 1.

The sensor 2 generates an electrical output voltage in dependence on the magnetic field intensity, which can be picked up at the terminals 6 of the sensor 3. The output voltage is substantially proportional to the sensed magnetic field intensity. Similarly, the output voltage is proportional to the flux density associated with the respective magnetic field intensity, as can also be seen on the basis of the characteristic curve 7 for the flux density B of the magnet 2 in FIG. 2. The characteristic curve 7 is represented in FIG. 2 in dependence on the path in the direction of the axis 5 along the magnet 2, to be precise along a line that is central in relation to the width of the magnet and parallel to and at a certain distance from the horizontal bottom surface of the magnet 2. The side view of the magnet 2 is shown here.

The sensor 2 may be a Hall sensor, a GMR sensor or the like. An analog type of Hall sensor is preferred.

The magnet 2 has a ramp- or wedge-shaped form in the direction of the axis 5, as revealed in particular by FIG. 2. This ramp is formed in such a way that the magnet 2 has a linear change in its height 8 in the direction of the axis 5. As a result, the flux density variation B for the magnetic field in the direction of the axis 5 is also substantially linear, which the characteristic curve 7 shows. Nonlinear effects only occur at the ends of the magnet 2, so that the operating range of the path and/or position measuring device 1 is preferably chosen inward from the two ends of the magnet 2. As can be seen in FIG. 1, the sensor 3 is arranged in relation to the magnet 2 in such a way that the air gap 9 between the magnet 2 and the sensor 3 is substantially constant along the direction of the axis 5.

The ramp- or wedge-shaped form of the magnet 2 may be produced from a conventional bar magnet by corresponding working. However, it is preferred for the magnet 2 to consist of polymer-bonded magnetic particles. In this case, the magnet 2 can be produced in a simple manner by injection molding.

The magnet 2 is fastened to the movable element 4. A detent 10 is provided on the magnet 2 for the fastening, so that the magnet 2 can engage in a latching manner on the movable element 4. It goes without saying that the magnet 2 may also be fitted or integrated in the movable element 4 in some other way. The movable element 4 generally consists of plastic and is produced in a customary manner by injection molding. If it is a polymer-bonded magnet 2, it is then appropriate to mold the magnet 2 into the movable part 4 in the manner of a two-component part during the production of the movable element 4.

Figure 3:
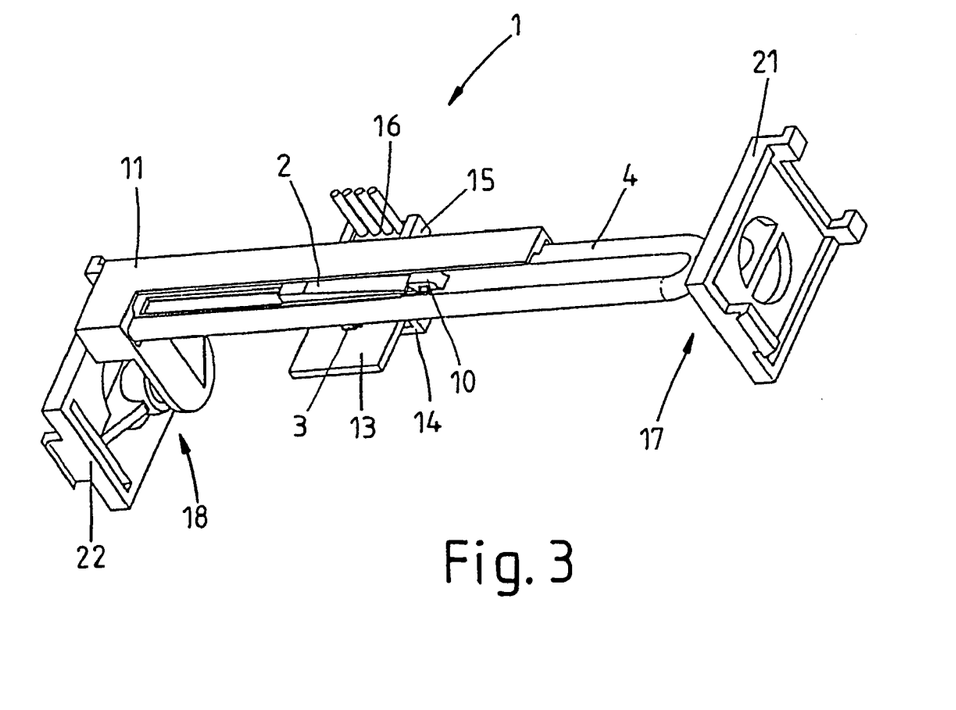
FIG. 3 shows the path and/or position measuring device in a more detailed form, likewise in a perspective representation.
Figure 4:
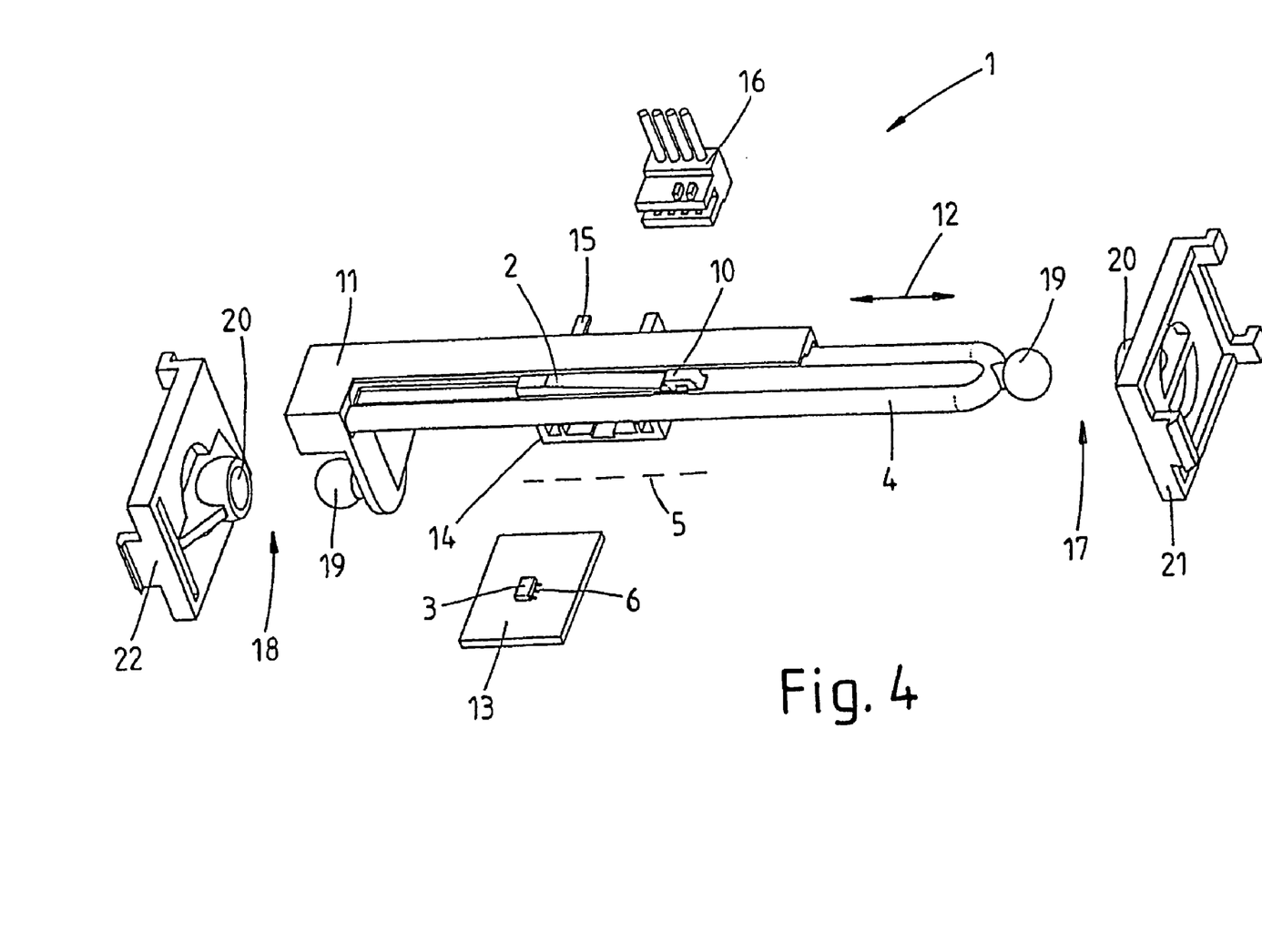
FIG. 4 shows the path and/or position measuring device from FIG. 3 in an exploded representation.

FIGS. 3 and 4 show the more detailed form of a path and/or position measuring device 1, which is intended in particular for a washing machine, a laundry dryer or the like for detecting vibrations and/or the loading of the drum.

The path and/or position measuring device 1 has a housing 11. The movable element comprises a push rod 4, which is mounted in a linearly movable manner in the housing 11. The ramp- or wedge-shaped magnet 2 is fastened to the push rod 4 in such a way, by being clipped in, molded around it or the like, that the direction of the axis 5 of the magnet 2 depicted by dashed lines in FIG. 4 is aligned approximately parallel to the direction of the longitudinal axis 12 of the push rod 4. The sensor 3, which is a Hall sensor, is designed in the manner of an integrated circuit and arranged on a printed circuit board 13. Electronics for evaluating the sensor signal generated by the sensor 3 may be additionally provided on the printed circuit board 13, but this is not shown any further. In the housing 11 there is a securing means 14 for the fastening of the printed circuit board 13.

Finally, a plug-in receptacle 15 for a connector 16 is arranged on the housing 11, to be precise on the securing means 14. The connector 16 serves for the electrical connection to the printed circuit board 13, whereby the electrical voltage for operating the path and/or position measuring device 1 is supplied and the data generated by the path and/or position measuring device 1 are passed on.

The path and/or position measuring device 1 is articulated on the one hand on the drum of the washing machine, the laundry dryer or the like and on the other hand on its frame. The ball joint 17 serves for the articulation on the drum. The ball joint 17 comprises a ball 19, which is fastened to the push rod 4, and also a ball socket 20, in which the ball 19 is mounted. The ball socket 20 is located on a fastening plate 21, which in turn is fastened to the drum as a movable part, in order in this way to transfer the movements of the drum to the push rod 4. A ball joint 18 likewise serves for the articulation on the housing 11, the ball 19 being arranged on the housing 11 and the ball joint 20 being arranged on the fastening plate 22. The fastening plate 22 is in turn arranged on the frame as a fixed part of the washing machine, the laundry dryer or the like.

Figure 5:
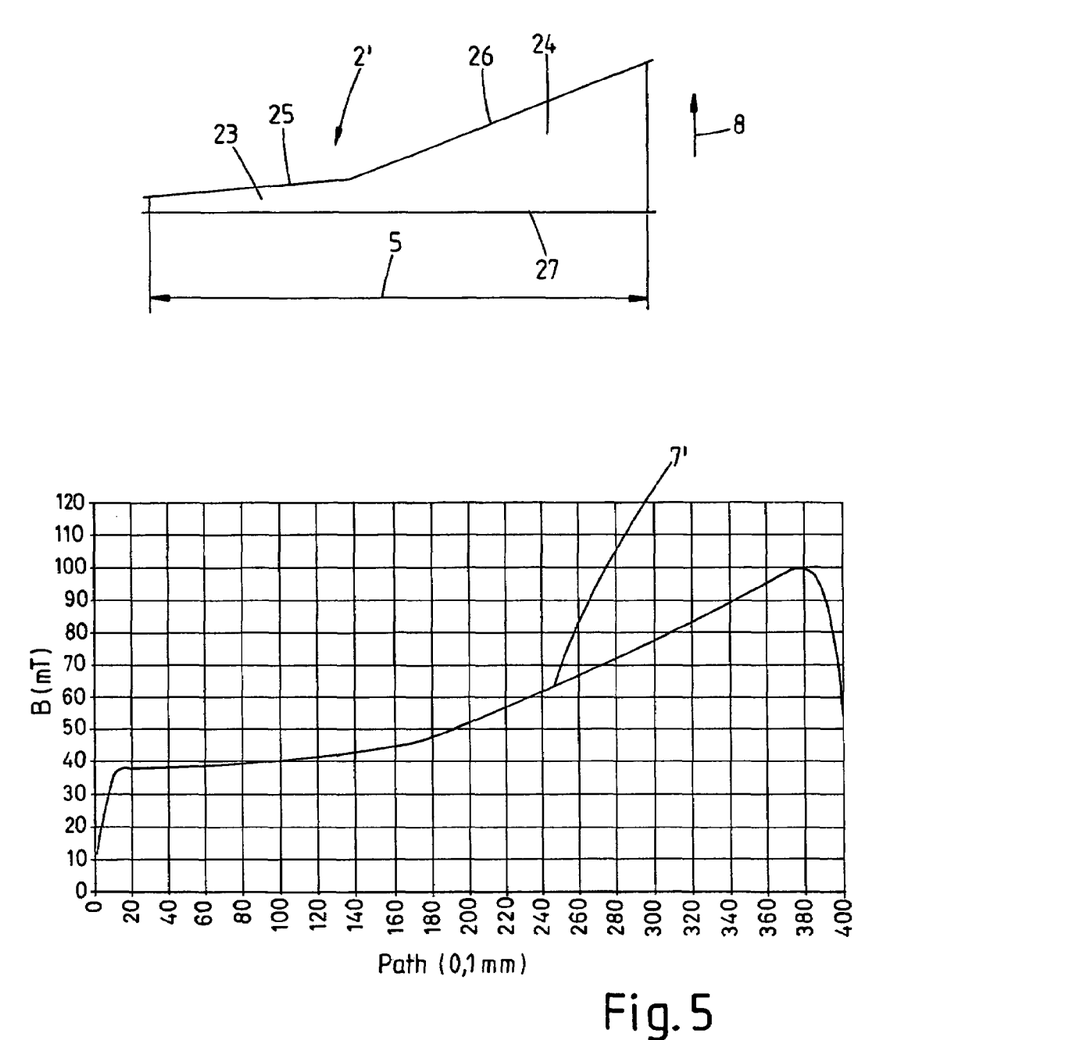
FIG. 5 shows the flux density variation in dependence on the path as a characteristic curve, as in FIG. 2, but for a path and/or position measuring device according to a further exemplary embodiment, FIG. 6 schematically shows in the manner of a basic diagram a path and/or position measuring device according to yet a further exemplary embodiment.

In FIG. 5, the magnet 2' for a path and/or position measuring device 1 according to a further exemplary embodiment can be seen. The magnet 2' has at least two regions 23, 24, the magnetic field intensity varying differently in the two regions 23, 24. As a result, the resolution for the path and/or position determination is different in the two regions 23, 24, as can be seen from the characteristic curve 7'. This advantageously allows higher-resolving regions to be brought into the characteristic curve 7' and/or an extension of the linear region of the characteristic curve to be realized. Consequently, the path and/or position measuring device 1 with the magnet 2' can also sense greater paths with a freely selectable characteristic curve at low cost. Furthermore, the path and/or position measuring device 1 with the magnet 2' is also suitable for a number of different path measuring tasks in the manner of a combined sensor. For example, the path and/or position measuring device 1 may serve for measuring unbalance caused by the tumbling movement of a washing machine drum during spinning and at the same time have a higher-resolving region within the unbalance measuring range for measuring the loading of the washing machine.

For forming the regions 23, 24 on the magnet 2', it is appropriate for the magnet 2' to have in the direction of the axis 5 a multiply ramp- or wedged-shaped form. As can likewise be seen from FIG. 5, the magnet 2' has for this purpose a number of adjoined, sloping sides 25, 26 with at least two different gradients and a straight side 27. Furthermore, the magnet 2' has a linear change in the height 8 in the direction of the axis 5. The air gap 9, which can be seen in FIG. 1, between the magnet 2' and the sensor 3 is substantially constant along the direction of the axis 5.

Moreover, the path and/or position measuring device 1 may be formed with the magnet 2' as explained above on the basis of FIG. 3 and FIG. 4.

Figure 6:
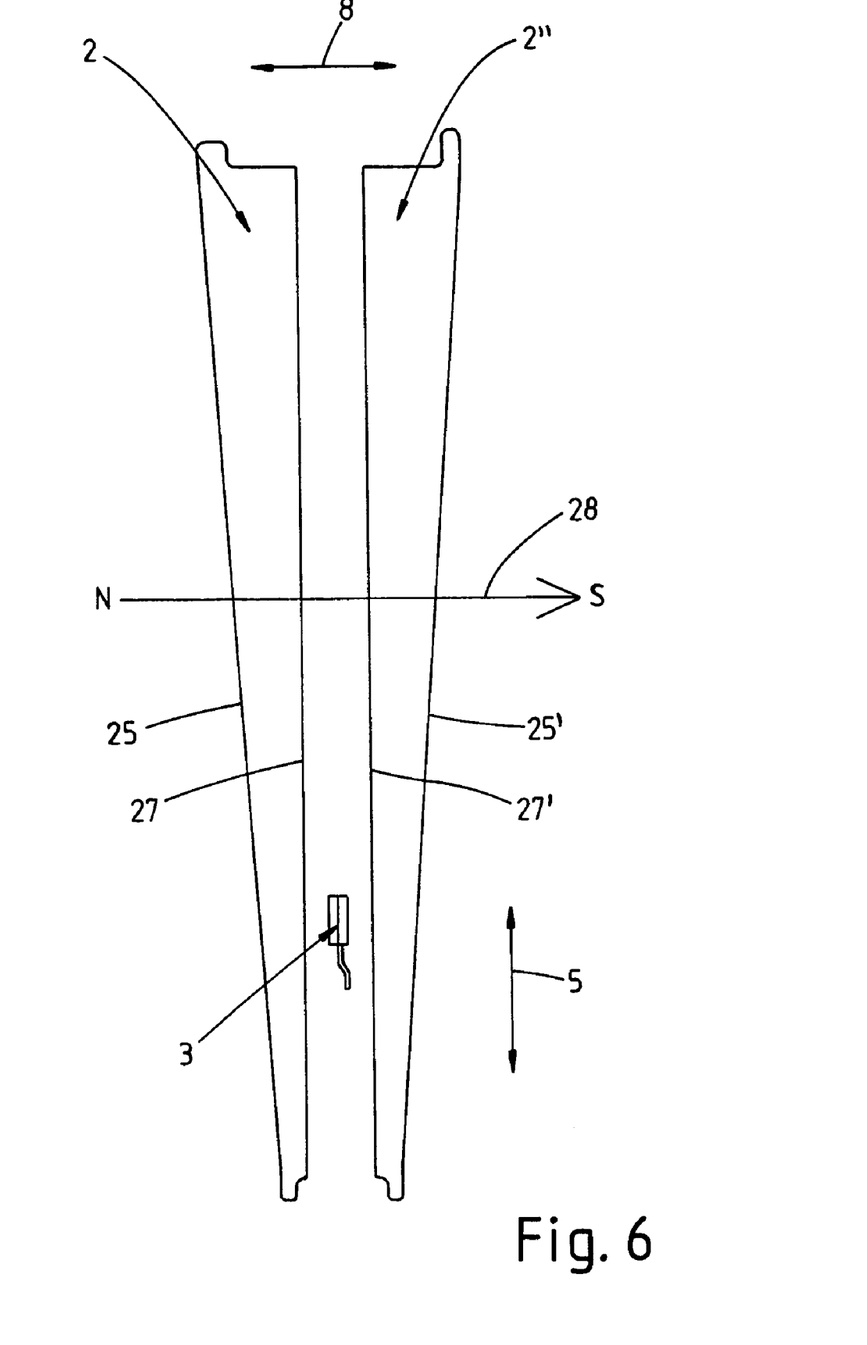

A path and/or position measuring device 1 according to yet a further exemplary embodiment can be seen as a basic diagram in FIG. 6. This path and/or position measuring device 1 has in addition to the magnet 2 a further magnet 2", the further magnet 2" likewise having such a form that the magnetic field intensity varies along an axis 5 of the magnet 2". The two magnets 2, 2" are arranged lying opposite each other in such a way that the axes 5 of the two magnets 2, 2" run substantially parallel to each other. The sensor 3 is located between the two magnets 2, 2".

The magnets 2, 2" have in the direction of the axis 5 a ramp- or wedge-shaped form with a sloping side 25, 25' and a straight side 27, 27', the height 8 of the magnets 2, 2" having a linear change in the direction of the axis 5. The two sloping sides 25, 25' are arranged facing away from one another and the straight sides 27, 27' are arranged facing one another. The two straight sides 27, 27' have a substantially constant distance from one another. The sensor 3 is finally located substantially centrally between the two straight sides 27, 27'.

The oppositely magnetized magnets 2, 2" lying opposite one another at a constant distance produce between them a strong magnetic field, which is parallel to the edge of the magnets 2, 2" and is symbolized in FIG. 6 by the arrow 28. In comparison with arrangements of magnets with a varying wedge-shaped gap, a wide range with a linear relationship between the position of the sensor 3 and the associated measured value is obtained. The strong magnetic field makes the path and/or position measuring device 1 more insensitive to electromagnetic interference.

Figure 7:
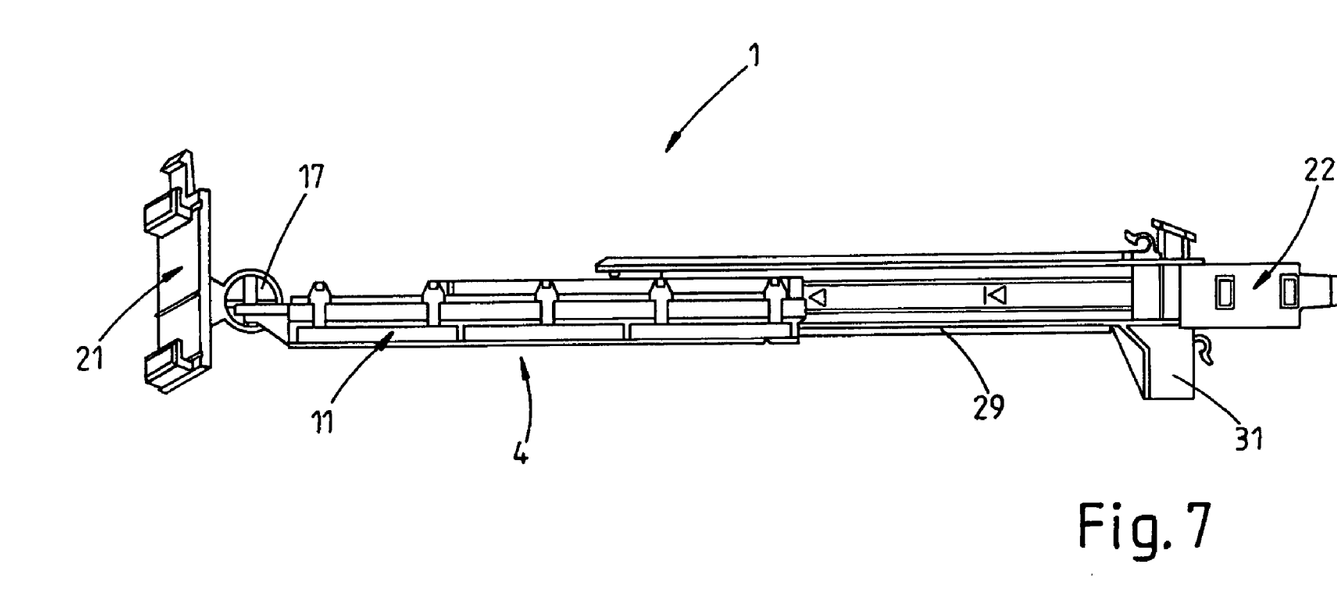
FIG. 7 shows the path and/or position measuring device according to FIG. 6 in more detailed form and in a perspective representation.
Figure 8:
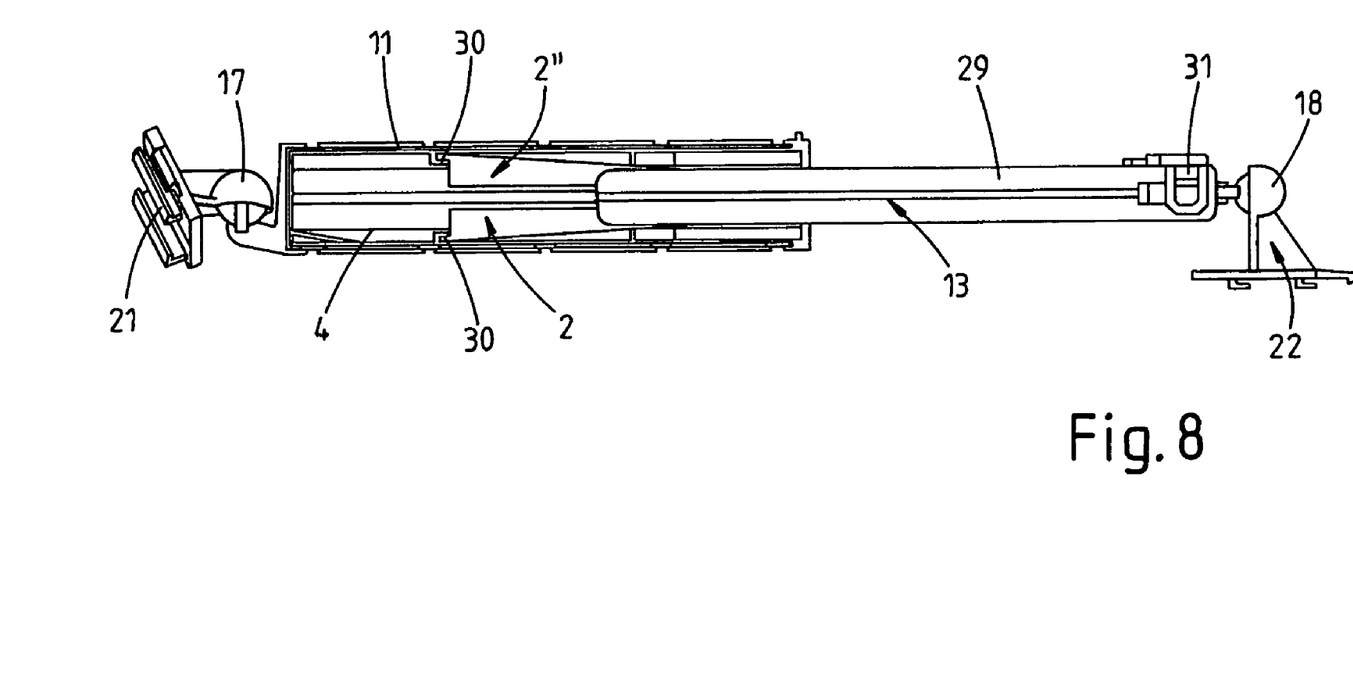
FIG. 8 shows the path and/or position measuring device from FIG. 7 with a cut-open housing.

The more detailed form of the path and/or position measuring device 1 that is shown in principle in FIG. 6 can be seen in FIG. 7 and FIG. 8.

As can be seen on the basis of FIG. 7, the path and/or position measuring device 1 has a housing 11. In this case, the housing 11 is formed as a movable element 4 and is articulated on the movable part by means of a ball joint 17 and a fastening plate 21. A slide 29 protrudes into the housing 11 on the side opposite from the ball joint 17, as can be seen in FIG. 8. The slide 29 is likewise arranged on the fixed part by means of a ball joint 18 and a fastening plate 22.

As can further be seen in FIG. 8, the two magnets 2, 2" are received in the housing 11 and are consequently fastened to the movable element 4. Serving for receiving the two magnets 2, 2" in the housing 11 is a latching engagement 30. The printed circuit board 13 on which the sensor 3 which can be seen in FIG. 6 is located is fastened to the slide 29 protruding into the housing 11. Finally, a plug-in receptacle 31 for a connector (not shown any further) for the electrical connection to the printed circuit board 13 is also arranged on the slide 29.

Moreover, the path and/or position measuring device 1 according to FIGS. 7, 8 may be formed in more detail as described above, for example the sensor 3 may be an analog type of Hall sensor, GMR sensor or the like.

If desired, finally, the further magnets 2', 2" according to FIGS. 5, 6 and also the magnet 2 may consist of polymer-bonded magnetic particles and be produced by means of injection molding. Similarly, the magnets 2, 2', 2" may be integrated in the movable element 4. For this purpose, the polymer-bonded magnet 2, 2', 2' may be molded into the movable element 4 in the manner of a two-component part.

The invention is not restricted to the exemplary embodiment described and represented. Rather, it comprises all developments that can be carried out by a person skilled in the art within the scope of the invention defined by the patent claims. Consequently, the path and/or position measuring device 1 can be used not only in other domestic appliances but also in motor vehicles, for example in motor vehicle locks, for chassis detection, for sensing the movement of hydraulic pistons on roofs of convertibles, for clutch pedal interrogation or the like.

LIST OF DESIGNATIONS

| | |
|---|---|
| 1: | path and/or position measuring device |
| 2: | magnet |
| 2': | magnet (with two regions) |
| 2": | (further) magnet |
| 3: | sensor |
| 4: | movable element/push rod |
| 5: | direction/axis of the magnet |
| 6: | terminal (on the sensor) |
| 7, 7': | characteristic curve (for the flux density of the magnet) |
| 8: | height (of the magnet) |
| 9: | air gap |
| 10: | detent |
| 11: | housing |
| 12: | longitudinal axis (of push rod) |
| 13: | printed circuit board |
| 14: | securing means |
| 15: | plug-in receptacle |
| 16: | connector |
| 17, 18: | ball joint |
| 19: | ball (of ball joint) |
| 20: | ball socket (of ball joint) |
| 21, 22: | fastening plate |
| 23, 24: | region (of magnet) |
| 25, 25': | sloping side (of magnet) |
| 26: | sloping side (of magnet) |
| 27, 27': | straight side (of magnet) |
| 28: | arrow for magnetic field |
| 29: | slide |
| 30: | latching engagement |
| 31: | plug-in receptacle |

We claim:

1. A path and/or position measuring device comprising a first magnet, a second magnet and a sensor for detecting a magnetic field intensity positioned between the first and second magnets;

wherein at least one of the first magnet and the sensor cooperate with a movable element;

wherein a magnetic field intensity of the first magnet varies along an axis of the first magnet and a magnetic field intensity of the second magnet varies along an axis of the second magnet, the first and second magnets having a wedge-shape along the direction of the axis including a sloping exterior side and a straight interior side and having a linear change in a height of the first and second magnets in the direction of the axis;

wherein the movable element enables a relative movement substantially in the direction of the axis of the first magnet between the sensor and the first magnet such that the path/position of the movable element is determined based on the magnetic field intensity detected by the sensor; and wherein the first and second magnets are arranged to oppose each other such that the sloping sides of the first and second magnets face away from one another and the straight sides of the first and second magnets face one another at a substantially constant distance from one another such that the respective axes of the first and second magnets are substantially parallel to each other.

2. The path and/or position measuring device of claim 1, wherein the sensor is located substantially centrally between the two straight sides of the first and second magnets.

3. The path and/or position measuring device of claim 1, wherein the sensor is one of a Hall sensor and a GMR sensor of an analog type;

wherein the sensor generates an electrical output voltage that depends on the magnetic field intensity;

wherein the output voltage is substantially proportional to the sensed magnetic field intensity of the magnetic field; and wherein the sensor an integrated circuit arranged on a printed circuit board, and wherein electronics for evaluating the sensor signal are located on the printed circuit board.

4. The path and/or position measuring device of claim 1, wherein the first and second magnets are fastened to the movable element, the movable element comprising a housing for receiving the first and second magnets by means of a latching engagement;

wherein the housing is articulated on a movable part at least by means of a ball joint;

wherein the printed circuit board is fastened to a slide protruding into the housing;

wherein a plug-in receptacle for a connector providing an electrical connection to the printed circuit board is arranged on the slide; and wherein the slide is arranged on a fixed part at least by means of a ball joint.

5. The path and/or position measuring device of claim 1, wherein the first and second magnets consist of polymer-bonded magnetic particles.

6. The path and/or position measuring device of claim 1, wherein the first and second magnets are coupled to one of a movable part and a fixed part of a domestic appliance and the sensor is coupled to the other one of the movable part and the fixed part of the domestic appliance.

7. The path and/or position measuring device of claim 3, wherein the output voltage is substantially proportional to a flux density of the magnetic field intensity.

8. The path and/or position measuring device of claim 5, wherein said magnets are injection molded such that the first and second magnets are integrated with the movable element as a two-component part.

* * * * *